(12) United States Patent
Taylor et al.

(10) Patent No.: US 6,506,806 B2
(45) Date of Patent: Jan. 14, 2003

(54) REDUCTION OF SURFACE TENSION

(75) Inventors: Charles Kenneth Taylor, Thorofare, NJ (US); Kai Volker Schubert, Chadds Ford, PA (US); Richard David Koehler, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/855,349

(22) Filed: May 15, 2001

(65) Prior Publication Data

US 2002/0014611 A1 Feb. 7, 2002

Related U.S. Application Data

(60) Provisional application No. 60/210,161, filed on Jun. 8, 2000.

(51) Int. Cl.$^7$ .............................................. B01F 17/00
(52) U.S. Cl. ................... 516/198; 101/494; 106/285; 106/287.28; 427/445; 516/199; 516/200; 516/201; 516/202; 516/203; 516/204; 516/DIG. 1; 570/124; 585/2; 585/3; 585/4
(58) Field of Search ........................ 252/8.61; 516/198, 516/199, DIG. 1, 200, 201, 202, 203, 204; 106/285, 287.28; 101/494; 427/445; 570/124; 585/2, 3, 4

(56) References Cited

U.S. PATENT DOCUMENTS

| 4,089,804 A | | 5/1978 | Falk |
| 4,188,307 A | | 2/1980 | Bathelt |
| 4,459,221 A | | 7/1984 | Hisamoto et al. |
| 4,508,764 A | * | 4/1985 | Zeldes ........................ 427/296 |
| 4,929,666 A | | 5/1990 | Schmidt et al. |
| 5,074,358 A | * | 12/1991 | Rendall et al. ............. 166/268 |
| 5,616,273 A | | 4/1997 | Clark et al. |
| 5,804,625 A | * | 9/1998 | Temperante et al. ........ 524/188 |
| 5,939,476 A | | 8/1999 | Lassila et al. |
| 6,051,154 A | * | 4/2000 | Meyer ........................... 252/3 |

FOREIGN PATENT DOCUMENTS

| FR | 2616150 | | 9/1993 |
| GB | 22445622 | * | 1/1992 |
| GB | 1381953 | | 8/1993 |
| JP | 55-75498 | | 6/1980 |
| WO | WO 88/03425 | | 5/1988 |

OTHER PUBLICATIONS

Lan–Hui Zhang and Guo–Xi Zhao, Dynamic Surface Tension of the Aqueous Solutions of Cationic–Anionic Surfactant Mixtures, *Journal of Colloid and Interface Science*, vol. 127, No. 2, Feb. 1989, Academic Press, Inc., pp. 353–361, Beijing, China.

Douglas E. Hirt, Robert K. Prud'Homme, Bernard Miller and Ludwig Rebenfeld, Dynamic Surface Tension of Hydrocarbon and Fluorocarbon Sufactant Solutions Using the Maximum Bubble Pressure Method, *Elsevier Science Publishers B.V.*, Colloids and Surfaces, 44 (1990), pp. 101–117, Amsterdam, The Netherlands. (No Month).

* cited by examiner

Primary Examiner—Anthony J. Green

(57) ABSTRACT

A composition for reducing surface tension comprising from about 0.1% to about 0.5% by weight of a hydrocarbon surfactant and from 0.0001% to about 0.3% by weight of a fluorocarbon surfactant, provided that the hydrocarbon surfactant is present at less than or equal to 0.08% by weight when the fluorocarbon surfactant is present at greater than or equal to 0.1% by weight is disclosed

11 Claims, 1 Drawing Sheet

REDUCTION OF SURFACE TENSION

This application claims the benefit of U.S. Provisional Application No. 60/210,161, filed Jun. 8, 2000.

FIELD OF THE INVENTION

This invention relates to the reduction of "dynamic" and equilibrium surface tensions in water-based systems by using a combination of fluorocarbon and hydrocarbon surfactants.

BACKGROUND OF THE INVENTION

In printing and coating applications, when thin water-based coatings such as inks, paints or varnishes are applied to a hydrophobic surface such as a polyolefin or polyester film, a surfactant is generally added to the coating material to lower its surface tension and make the surface easier to wet and coat smoothly. The suitability of the surfactant and the amount required is typically determined by measurements of the surface tension of the coating material after adding the surfactant.

If these measurements are made at equilibrium conditions, they may be grossly misleading for a coating application carried out at high speed, where new surfaces or interfaces are being rapidly created by the physical spreading of the coating on the substrate, or by pneumatic means such as spraying. Then there may be insufficient time for adequate surfactant diffusion, adsorption and molecular orientation at the coating-surface interface to reach equilibrium conditions. For such applications, the surface tension measured under dynamic conditions may be more meaningful.

In high-speed printing and coating applications, if the surface tension of the coating is insufficient to wet the substrate after a few seconds the coatings, and especially thin coatings, will "de-wet" resulting in undesirable surface defects. That is, an initially smooth coating can "crawl back" or "retract" from the surface, and create an uneven, rippled surface appearance. In this case, the equilibrium surface tension measurement also becomes important.

The rapid reduction of surface tension of a water-based solution may also be important in other applications. For example, in agricultural applications, quick wetting of a leaf surface is important for retention of the agricultural spray solution being applied to a plant. Thus the efficient application of such sprays may be heavily dependent on the surface tension of the spray solution as a function of time. Many hydrocarbon surfactants are used in the coatings industry to promote good dynamic effects, that is, offer low initial surface tension. However, such surfactants generally do not offer the low equilibrium surface tension reduction needed to ensure consistent wetting of many substrates. In addition they may cause the appearance of surface defects in the coating because of relatively low solubility in waterborne formulations. Polymeric films may require pretreatment for surface modification by means such as corona treatment, flame ionization, or pre-application of a "tie-layer" or primer to the substrate.

Although fluorocarbon surfactants offer excellent equilibrium surface tensions, they are not widely used in such high-speed applications because, in addition to being costly, they generally do not give a low initial surface tension and may cause foaming.

An article by Hirt, et al., appearing in Colloids and Surfaces (1990), 44, pp 101–117, and titled "Dynamic Surface Tension of Hydrocarbon and Fluorocarbon Surfactant Solutions using the Maximum Bubble Pressure Method", discloses that equimolar and 3/1 molar ratio mixtures of a nonionic hydrocarbon surfactant and a nonionic fluorocarbon surfactant synergistically improve the dynamic surface tension of an aqueous solution at an overall surfactant concentration of 30 millimoles per liter (mM). For an overall concentration of 3 mM, such synergy was found at lower bubble frequencies, but not at the higher frequencies desired for high-speed applications. At overall concentrations of 0.3 mM and 0.03 mM, no synergy was found. Thus, useful synergy was found only at relatively high overall surfactant concentrations of 30 mM, of which the fluorocarbon surfactant represented 15 mM in the equimolar mixtures and 7.5 mM in the 3/1 molar mixtures. At these concentrations, the fluorocarbon surfactant is costly and may cause foaming.

There is a need for a surfactant composition for coating and printing compositions which will reduce the initial or "dynamic" surface tension and equilibrium surface tension at lower fluorocarbon surfactant concentrations. The present invention provides such a composition.

SUMMARY OF THE INVENTION

This invention comprises a composition for use in a coating or printing composition to reduce surface tension quickly and substantially when the coating or printing composition is applied to a substrate surface. The composition comprises a hydrocarbon surfactant and a fluorocarbon surfactant, wherein the concentration of hydrocarbon surfactant is from about 0.01% to about 0.5% by weight and the concentration of the fluorocarbon surfactant is from about 0.0001% to about 0.3% by weight, provided that the concentration of hydrocarbon surfactant is less than or equal to 0.08% by weight when the concentration of the fluorocarbon surfactant is greater than or equal to 0.1% by weight. The composition reduces the surface tension of a coating or printing composition to which it is added. The reduction in surface tension is both initial and quick (for example within ten seconds) after new surfaces/interfaces are created. Preferably the concentration of fluorocarbon surfactant is from about 0.0005% to about 0.3% by weight. More preferably the concentration of fluorocarbon surfactant is from about 0.001% to about 0.1% by weight.

This invention also comprises a method for reducing surface tension of a coating or printing composition when applied to a substrate surface comprising addition of the above described surfactant composition to the coating or printing composition. This invention further comprises a method for reducing surface tension of a coating or printing composition when applied to a substrate surface comprising the addition to the coating or printing composition of a composition comprising from about 0.0001% to about 0.3% by weight of a fluorocarbon surfactant, provided that the coating or printing composition contains a hydrocarbon surfactant and said hydrocarbon surfactant is present at less than or equal to 0.08% by weight when the fluorocarbon surfactant is present at greater than or equal to 0.1% by weight.

DETAILED DESCRIPTION OF THE INVENTION

Figure 1:
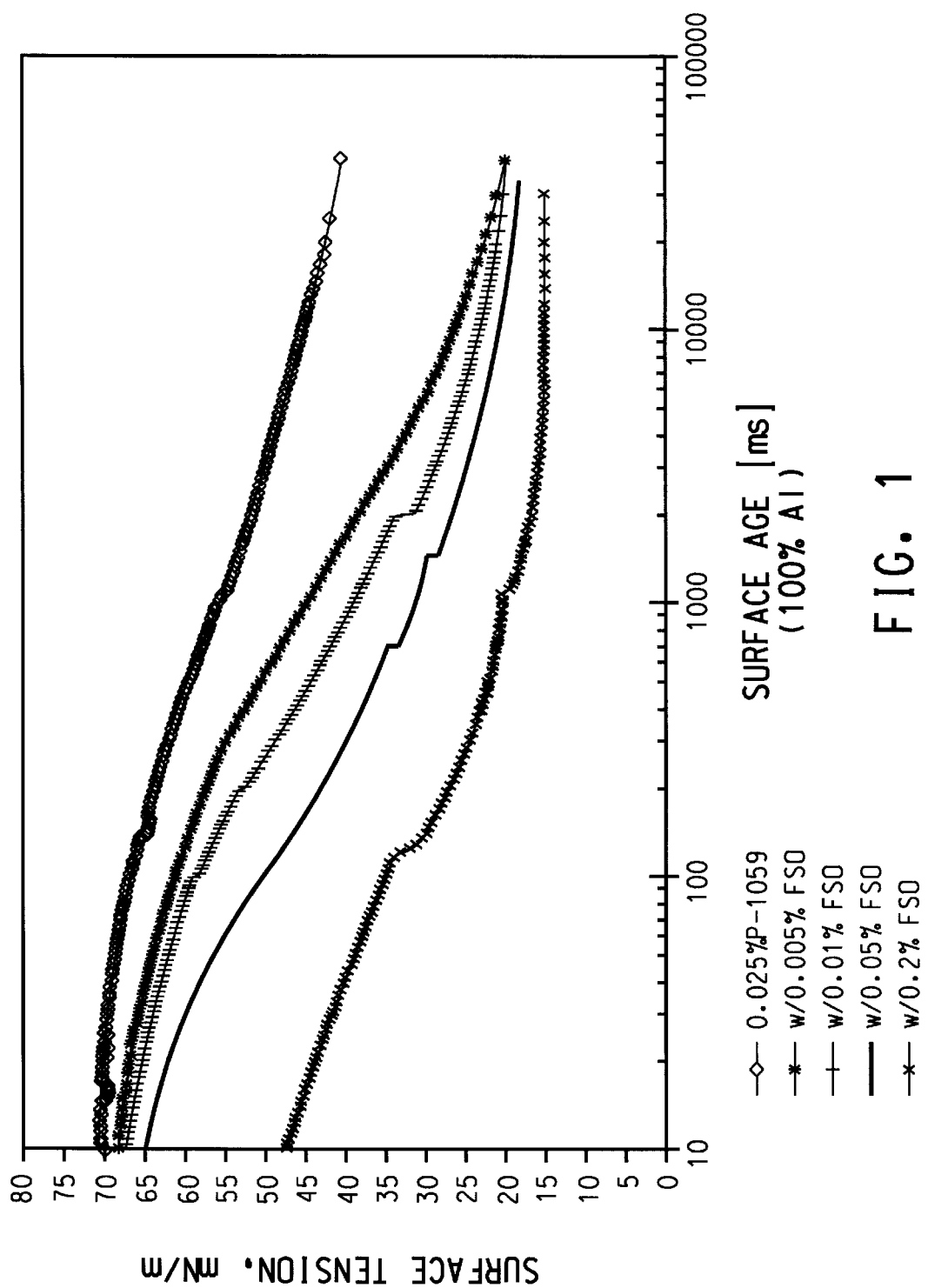
FIG. 1 is a graph of surface tension versus surface age for a composition of the present invention containing the fluorocarbon surfactant ZONYL FSO and the hydrocarbon surfactant WITCONATE P-1059.

Trademarks and tradenames are indicated throughout by capitalization.

This invention comprises a low-foaming water-based surfactant composition for addition to a coating or printing composition to rapidly reduce its surface tension when applied to a substrate surface. The composition contains a hydrocarbon-based surfactant and a fluorocarbon surfactant. The fluorocarbon surfactant is nonionic, anionic, cationic or amphoteric, and may contain a perhalogenated or perfluorinated alkyl terminal group. The fluorocarbon surfactant is of formula $(R_f)_a(Q)_bZ$ wherein $R_f$ is a fluoroaliphatic radical or group, and a is 1 or 2. $R_f$ is generally a fluorinated, preferably saturated, monovalent, non-aromatic radical of at least 3 carbon atoms. The fluoroaliphatic radical is straight, branched or, if sufficiently large, cyclic. A fully-fluorinated radical is preferred, but hydrogen or chlorine atoms can be present in the radical, provided that not more than one atom of either is present for every two carbon atoms. Fluoroaliphatic radicals containing about 1 to 12 carbon atoms are most preferred.

Q is a linking group, and b is 0 or 1. Note that when b is 0, Q is absent, and $R_f$ and Z are linked by a covalent bond. Q is a multivalent linking group such as: alkylene (e.g., methylene, ethylene, cyclohexylene, arylene, and the like), or combinations of such moieties with heteroatom containing groups (e.g., oxy, thio, carbonyl, sulfonyl, sulfinyl, sulfonamido, carbonamido, ureylene, carbamato, imino, et cetera), and combinations such as sulfonamidoalkylene, carbonamidoalkylene, oxydialkylene (e.g., $—C_2H_4OC_2H_4—$), thiodialkylene (e.g., $—C_2H_4SC_2H_4—$) alkylenecarbamato and the like. Q groups for a specific composition will depend upon the specific reactants used in preparing the surfactant.

Z is a water solubilizing polar group or moiety, e.g. sulfonates and sulfates and their metal salts, amine groups (e.g., $—NH_2$ or NHR where R is a lower alkyl group such as methyl ethyl or butyl), sulfoammonium and carboxyammonium groups, poly(oxyethylene), poly(oxypropylene), carboxylates, alkyloxylates, phosphates, and the like.

The preferred fluorocarbon surfactant is a perfluoroalkyl ethoxylate of the formula:

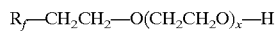

$$R_f—CH_2CH_2—O(CH_2CH_2O)_x—H$$

wherein x is from 2 to about 20, and $R_f$ is a perfluorinated hydrocarbon of the structure $CF_3—(CF_2CF_2)_n$ and n is from 2 to about 6. Such perfluoroalkyl ethoxylates are readily commercially available, and include products such as ZONYL FSO, ZONYL FSN and ZONYL FS 300, each available from E. I. du Pont de Nemours and Company, Wilmington, Del. (DuPont). Other suitable fluorocarbon surfactants include, among others, surfactants such as ZONYL FSK, an amphoteric fluorosurfactant from DuPont, ZONYL FS-62, an anionic (sulfonate) from DuPont, FLUORAD FC 170, a nonionic fluorosurfactant from 3M Company, Minneapolis, Minn., (3M) and FC 129, an anionic (carboxylate) fluorosurfactant from 3M.

The concentration of the fluorocarbon surfactant is from 0.0001% to 0.3% by weight. Preferably the concentration of fluorocarbon surfactant is from about 0.0005% to about 0.3% by weight. More preferably the concentration of fluorocarbon surfactant is from about 0.001% to about 0.1% by weight. In comparison to the prior art, such as the previously referenced Hirt article, it is surprising that such low concentrations of a fluoroalkyl ethoxylate measurably improve the surface tension of mixtures with a hydrocarbon-based surfactant solution. Amounts below 0.0001% by weight are only marginally effective in improving the surface tension of mixtures with a hydrocarbon-based surfactant. Amounts above 0.3% by weight are costly and may cause foaming problems.

The hydrocarbon surfactants suitable for use in the present invention include any that are useful for achieving a low surface tension in an aqueous system, and particularly those useful for achieving low "dynamic" surface tension. "Dynamic surface tension" is used herein to mean lowering the surface tension as a function of time. Examples of such surfactants include nonionic, anionic, cationic and amphoteric surfactants. Many are commercially available such as TRITON X-100 from Dow Chemical Corporation, Midland, Mich., an octylphenoxypolyethoxyethanol; Aerosol OT from CYTEC Industries, West Paterson, N.J., a sodium dioctyl sulfosuccinate; WITCONATE P-1059 from CK Witco Corporation, Houston, Tex., an alkaryl sulfonate isopropylamine salt; SURFADONE LP-100 from International Specialty, Wayne, N.J., an N-octyl-2-pyrarolidone; SURFYNOL 104 from Air Products and Chemicals Inc., Allentown, Pa., a tetramethyl-5-decyne-4,7-diol,2,4,7,9-; DYNOL 604 from Air Products and Chemicals Inc., Allentown, Pa., an ethoxylated acetylenic diol mixture; MERPOL SE from Stepan Company, Northfield, Ill., a nonionic surfactant (5EO adduct of tridecyl alcohol); and MERPOL SH from Stepan Company, Northfield, Ill., (the 8EO adduct of tridecyl alcohol).

The concentration of hydrocarbon surfactant is from about 0.01 to about 0.5% by weight, provided that it is less than or equal to 0.08% by weight when the fluorocarbon surfactant is greater than or equal to 0.1% by weight. Preferably the concentration of the hydrocarbon surfactant is below about 0.3% by weight. The larger amounts can be used but are generally unnecessary.

The weight ratio of hydrocarbon-based surfactant to fluorocarbon surfactant is preferably at least 2. A weight ratio of hydrocarbon-based surfactant to fluorocarbon surfactant below 2 represents a higher use of the much more expensive fluorocarbon surfactant. The weight ratio is more preferably at least 5, and still more preferably at least 10. The present invention has shown a measurable improvement in surface tension as a function of time when the amount of hydrocarbon was even 25 times the concentration of fluorocarbon surfactant.

The surfactant composition of the present invention is prepared by physically mixing the hydrocarbon surfactant and the fluorocarbon surfactant. Preferably the composition is in the form of an aqueous solution.

The present invention further comprises a method for rapidly lowering the dynamic surface tension of a coating or printing composition comprising addition to a coating or printing composition of a surfactant composition of the present invention as previously described prior to its application to a substrate surface. The surfactant composition is physically mixed with the coating or printing composition. It is preferably mixed in an amount such that the concentration of the hydrocarbon surfactant in the coating or printing composition is from about 0.01% to about 0.5% by weight, and the concentration of the fluorocarbon surfactant in the coating or printing composition is from about 0.001% to about 0.3% by weight, provided that the concentration of hydrocarbon surfactant is less than or equal to 0.08% by weight when the concentration of the fluorocarbon surfactant is greater than or equal to 0.1% by weight. Preferably the concentration of the hydrocarbon surfactant is below about 0.3% by weight and the concentration of the fluorocarbon surfactant is from about 0.001% to about 0.1% by weight. The weight ratio of the hydrocarbon surfactant to the fluorocarbon surfactant in the coating or printing composition is at least 2, preferably at least 5, and more preferably at least 10.

Alternatively, the present invention comprises a method reducing surface tension of a coating or printing composition when applied to a substrate surface comprising the addition to the coating or printing composition of a composition comprising from about 0.0001% to about 0.3% by weight of a fluorocarbon surfactant, provided that the coating or printing composition contains a hydrocarbon surfactant and said hydrocarbon surfactant is present at less than or equal to 0.08% by weight when the fluorocarbon surfactant is present at greater than or equal to 0.1% by weight. Preferably the hydrocarbon surfactant, already present in the coating or printing composition, is present at from about 0.01% to about 0.5% by weight.

The surface tension vs. time profile is typically important within ten seconds of application of the coating or printing composition containing the surfactant composition of the present invention to the surface. The method for applying this composition to a surface includes spraying, ink-jet printing, slot coating, curtain coating and other printing and coating methods as are well-known in the art. The methods of the present invention are suitable for a wide variety of substrate surfaces. These include organic polymers; metals; papers; paper products; natural and synthetic textiles including wovens and nonwoven materials such as wool, silk, nylon, polyolefin, and others; leathers; construction materials such as wood, stone, concrete, brick, ceramics, tile, glass, stucco, gypsum drywall, particle board, chip board, granite, marble, flagstone, and sandstone; laminates; adhesives; films; and agricultural products of nature such as plants and parts thereof such as leaves, grasses and the like. The methods of the present invention are most useful in those situations requiring that the substrate surface be coated within a few seconds, preferably ten seconds or less. Advantages of the invention include avoiding de-wetting of the surface and thus avoiding defects such as an uneven coating or retraction of the coating.

EXAMPLES

Solutions of a number of hydrocarbon surfactants were prepared in deionized water. The hydrocarbon surfactants chosen were those for which the manufacturer claimed good performance as an agent for achieving a low dynamic surface tension. The concentration of hydrocarbon surfactant in each case was held constant at ranging from 0.025% to 0.5% by weight on an active ingredient basis. For comparison with prior art, the comparable concentration on a millimolar (mM) basis is listed below:

| Hydrocarbon Surfactant | Source | Concentration, wt % | Concentration, mM |
| --- | --- | --- | --- |
| WITCONATE P-1059 | CK Witco Corp. Houston, TX | 0.025 | 1.30 |
| SURFYNOL 104 | Air Products and Chemicals Allentown, PA | 0.025 | 1.25 |
| SURFADONE LP-100 | International Specialty Wayne, NJ | 0.025 | 1.28 |
| Aerosol OT | CYTEC Industries West Paterson, NJ | 0.025 | 0.57 |
| TRITON X-100 | Dow Chemical Co. Midland, MI | 0.025 | 0.39 |
| TERGITOL NP-10 | Union Carbide Corp. Danbury, CT. | 0.025 | 0.38 |

Example 1

Various amounts of ZONYL FSO available from E. I. du Pont de Nemours and Company, Wilmington, Del. were then added to the WITCONATE P-1059 solution, holding the concentration of hydrocarbon surfactant constant. The concentrations of ZONYL FSO used in the tests are listed below on a weight basis and mM basis for comparison with prior art:

| ZONYL FSO wt % | ZONYL FSO mM |
| --- | --- |
| 0.001 | 0.0133 |
| 0.005 | 0.067 |
| 0.01 | 0.133 |
| 0.05 | 0.67 |
| 0.10 | 1.33 |
| 0.20 | 2.66 |

The surface tension of the resulting solutions were then measured with a Kruss BP2 tensiometer as a function of time, using the method known in the art as the "maximum bubble pressure" method. This method is described in the previously referenced Hirt article, and is also described more broadly in "A Review of Instruments for Static and Dynamic Surface and Interfacial Tension Measurement", presented at the 84$^{th}$ Annual Meeting and Expo, Anaheim, Calif. 1993, by L. B. Gilman of Kruss USA. The dynamic surface tension of a mixture of WITCONATE P1059 and ZONYL FSO is shown graphically in FIG. 1 and numerically in Table 1.

TABLE 1

EXAMPLE 1
0.025 wt % WITCONATE P-1059
with ZONYL FSO

| ZONYL FSO | Surface age milliseconds [ms] | | | |
| --- | --- | --- | --- | --- |
| | 10 ms | 100 ms | 1000 ms | 10000 ms |
| | Surface Tension, Mn/m | | | |
| 0.000 wt % | 71 | 67 | 55 | 46 |
| 0.001 wt % | 70 | 65 | 49 | 32 |
| 0.005 wt % | 69 | 61 | 44 | 27 |
| 0.01 wt % | 67 | 58 | 38 | 24 |
| 0.05 wt % | 65 | 51 | 31 | 21 |
| 0.10 wt % | 58 | 43 | 25 | 20 |

Examples 2–10

Various fluorocarbon surfactants were added to solutions of hydrocarbon surfactants prepared as previously described. The surface tension of the resulting solutions were measured as described in Example 1. Table A lists the combinations of hydrocarbon surfactants and fluorocarbon surfactants for all examples. All of the ZONYL fluorocarbon surfactants were obtained from E. I. duPont de Nemours and Company, Wilmington, Del. The FLUORAD fluorocarbon surfactants were obtained from 3M Company, Minneapolis, Minn. The hydrocarbon surfactants were obtained from various commercial sources as previously listed. Tables 2 to 10 list the surface tension data for each of Examples 2–10.

Mixtures of various hydrocarbon-based surfactants and fluorocarbon surfactants in various concentrations are shown only in Tables 3 to 13. For convenience, these examples are all summarized in Table 2 below.

TABLE A

SUMMARY OF EXAMPLES

| Example No. | Hydrocarbon | Hydrocarbon % | Fluorocarbon | Fluorocarbon % |
|---|---|---|---|---|
| 1 | WITCONATE P-1059 | 0.025% | ZONYL FSO | 0 to 0.1% |
| 2 | WITCONATE P-1059 | 0.025% | ZONYL FS-62 | 0 to 0.1% |
| 3 | TRITON X-100 | 0.025% | ZONYL FSO | 0 to 0.1% |
| 4 | AEROSOL OT-70 | 0.025% | ZONYL FSO | 0 to 0.1% |
| 5 | SURFYNOL 104 | 0.025% | ZONYL FSO | 0 to 0.1% |
| 6 | SURFADONE LP100 | 0.025% | ZONYL FSO | 0 to 0.1% |
| 7 | SURFADONE LP-100 | 0.05% | ZONYL FSO | 0 to 0.1% |
| 8 | DYNOL 604 | 0.1% | ZONYL FSK | 0 to 0.1% |
| 9 | MERPOL SE | 0.25% | FLUORAD FC-129 | 0 to 0.1% |
| 10 | WITCONATE P-1059 | 0.5% | ZONYL FS-62 | 0 to 0.1% |
| 11 | WITCONATE P-1059 | 0.5% | ZONYL FSK | 0 to 0.1% |
| 12 | MERPOL SH | 0.5% | FLUORAD FC-170 | 0 to 0.1% |

TABLE 2

EXAMPLE 2
0.025 wt % TRITON X-100 with ZONYL FSO

| ZONYL FSO | 10 ms | 100 ms | 1000 ms | 10000 ms |
|---|---|---|---|---|
| | | Surface Tension, mN/m | | |
| 0.000 wt % | 71 | 60 | 41 | 34 |
| 0.001 wt % | 67 | 53 | 34 | 28 |
| 0.005 wt % | 66 | 51 | 35 | 28 |
| 0.01 wt % | 64 | 49 | 32 | 24 |
| 0.05 wt % | 62 | 47 | 30 | 22 |
| 0.10 wt % | 60 | 44 | 27 | 20 |

TABLE 3

EXAMPLE 3
0.025 wt % Aerosol OT-70 with ZONYL FSO

| ZONYL ESO | 10 ms | 100 ms | 1000 ms | 10000 ms |
|---|---|---|---|---|
| | | Surface Tension, mN/m | | |
| 0.000 wt % | 69 | 63 | 54 | 44 |
| 0.001 wt % | 67 | 60 | 48 | 37 |
| 0.005 wt % | 67 | 59 | 47 | 34 |
| 0.01 wt % | 66 | 59 | 43 | 29 |
| 0.05 wt % | 66 | 56 | 41 | 27 |
| 0.10 wt % | 65 | 54 | 37 | 24 |

TABLE 4

EXAMPLE 4
0.025 wt % SURFYNOL 104 with ZONYL FSO

| ZONYL FSO | 10 ms | 100 ms | 1000 ms | 10000 ms |
|---|---|---|---|---|
| | | Surface Tension, mN/m | | |
| 0.000 wt % | 60 | 50 | 43 | 41 |
| 0.001 wt % | 54 | 44 | 37 | 20 |
| 0.005 wt % | 52 | 43 | 34 | 21 |
| 0.01 wt % | 53 | 43 | 31 | 20 |
| 0.05 wt % | 52 | 41 | 28 | 20 |
| 0.10 wt % | 50 | 38 | 24 | 18 |

TABLE 5

EXAMPLE 5
0.05 wt % SURFADONE lp 100 with ZONYL FSO

| ZONYL FSO | 10 ms | 100 ms | 1000 ms | 10000 ms |
|---|---|---|---|---|
| | | Surface Tension, mN/m | | |
| 0.000 wt % | 53 | 46 | 41 | 38 |
| 0.001 wt % | 52 | 45 | 41 | 37 |
| 0.005 wt % | 50 | 42 | 37 | 32 |
| 0.01 wt % | 49 | 42 | 34 | 27 |
| 0.05 wt % | 47 | 40 | 28 | 21 |
| 0.10 wt % | 46 | 37 | 25 | 19 |

TABLE 6

EXAMPLE 6
0.10 wt % DYNOL 604 with ZONYL FSK

| ZONYL FSK | 10 ms | 100 ms | 1000 ms | 10000 ms |
|---|---|---|---|---|
| | | Surface Tension, mN/m | | |
| 0.000 wt % | 42 | 30 | 27 | 26 |
| 0.001 wt % | 40 | 30 | 26 | 25 |
| 0.005 wt % | 48 | 32 | 26 | 25 |
| 0.01 wt % | 45 | 32 | 26 | 24 |
| 0.05 wt % | 44 | 30 | 24 | 22 |
| 0.10 wt % | 42 | 29 | 23 | 21 |

TABLE 7

EXAMPLE 7
0.25 wt % MERPOL SE with FLUORAD FC-129

| FLUORAD FC-129 | 10 ms | 100 ms | 1000 ms | 10000 ms |
|---|---|---|---|---|
| | | Surface Tension, mN/m | | |
| 0.000 wt % | 58 | 42 | 29 | 27 |
| 0.001 wt % | 63 | 40 | 29 | 27 |
| 0.005 wt % | 60 | 37 | 28 | 27 |
| 0.01 wt % | 58 | 37 | 28 | 27 |
| 0.05 wt % | 42 | 29 | 25 | 24 |
| 0.10 wt % | 47 | 28 | 23 | 22 |

TABLE 8

EXAMPLE 8
0.50 wt % WITCONATE P-1059 with ZONYL FS-62

| ZONYL FS-62 | Surface age milliseconds [ms] | | | |
|---|---|---|---|---|
| | 10 ms | 100 ms | 1000 ms | 10000 ms |
| | Surface Tension, mN/m | | | |
| 0.000 wt % | 44 | 33 | 30 | 28 |
| 0.001 wt % | 44 | 33 | 30 | 28 |
| 0.005 wt % | 44 | 32 | 27 | 26 |
| 0.01 wt % | 45 | 34 | 28 | 27 |
| 0.05 wt % | 41 | 31 | 27 | 25 |
| 0.10 wt % | 41 | 29 | 25 | 22 |

TABLE 9

EXAMPLE 9
0.50 wt % WITCONATE P 1059 with ZONYL FSK

| ZONYL FSK | Surface age milliseconds [ms] | | | |
|---|---|---|---|---|
| | 10 ms | 100 ms | 1000 ms | 10000 ms |
| | Surface Tension, mN/m | | | |
| 0.000 wt % | 42 | 33 | 30 | 28 |
| 0.001 wt % | 44 | 33 | 30 | 28 |
| 0.005 wt % | 44 | 32 | 28 | 26 |
| 0.01 wt % | 45 | 33 | 29 | 27 |
| 0.05 wt % | 41 | 31 | 29 | 25 |
| 0.10 wt % | 41 | 29 | 25 | 22 |

TABLE 10

EXAMPLE 10
0.50 wt % MERPOL SH with FLUORAD FC-170

| FLUORAD FC-170 | Surface age milliseconds [ms] | | | |
|---|---|---|---|---|
| | 10 ms | 100 ms | 1000 ms | 10000 ms |
| | Surface Tension, mN/m | | | |
| 0.000 wt % | 47 | 38 | 33 | 32 |
| 0.001 wt % | 47 | 35 | 32 | 31 |
| 0.005 wt % | 47 | 36 | 33 | 31 |
| 0.01 wt % | 47 | 35 | 31 | 30 |
| 0.05 wt % | 48 | 38 | 31 | 29 |
| 0.10 wt % | 49 | 38 | 31 | 28 |

The graph in FIG. 1 and the data in the tables clearly show the remarkable decrease in surface tension vs. time profile obtained by adding even very small amounts of ZONYL FSO or other fluorosurfactant to conventional hydrocarbon surfactants, well below the concentrations that might create a foaming problem.

Example 11

A mixture of ZONYL FSH, fluorinated surfactant, and SURFONYL 104, hydrocarbon surfactant was added in the amount shown below on Table 11 to proprietary paper coating solutions from Claris Technologies, Sturtevant, Wis., 53177. The surface tension of the resulting mixture was measured as described in Example 1. ZONYL FSH was obtained from E. I. duPont de Nemours and Company, Wilmington, Del. SURFYNOL 104 was obtained from the Air Products Corporation in Allentown, Pa. The resulting data are in Table 11.

TABLE 11

EXAMPLE 11

| Added Surfactants | | Surface age milliseconds [ms] | | | |
|---|---|---|---|---|---|
| SURFYNOL 104 | ZONYL FSH | 10 ms | 100 ms | 1000 ms | 10000 ms |
| | | Surface Tension, mN/m | | | |
| 0.000 wt % | 0.000 wt % | 42 | 38 | 35.5 | 33 |
| 0.05 wt % | 0.013 wt % | 39 | 34 | 33 | 30.5 |

Example 12

A mixture of ZONYL FSH, a fluorinated surfactant, and DYNOL 604, a hydrocarbon surfactant, was added in the amount shown in Table 12 to a proprietary floor finish from Johnson Wax Professional in Sturtevant, Wis. 53177. The surface tension was measured as in Example 1. ZONYL FSH was obtained from E. I. du Pont de Nemours and Company, Wilmington, Del. and DYNOL 604 was obtained from Air Products Corporation, Allentown, Pa. The resulting data are in Table 12.

TABLE 12

EXAMPLE 12

| Added Surfactants | | Surface age milliseconds [ms] | | | |
|---|---|---|---|---|---|
| DYNOL 604 | ZONYL FSH | 10 ms | 100 ms | 1000 ms | 10000 ms |
| | | Surface Tension, mN/m | | | |
| 0.000 wt % | 0.000 wt % | 38.5 | 33 | 32 | 32 |
| 0.40 wt % | 0.025 wt % | 39 | 30 | 28.5 | 28 |

Example 13

ZONYL FSH was added in the amount shown in Table 13 to proprietary paper coating solutions containing hydrocarbon surfactants available from Claris Technologies, Sturtevant, Wis., 53177. The surface tension of the resulting solution was measured as described in Example 1. ZONYL FSH fluorocarbon surfactant was obtained from E. I. duPont de Nemours and Company, Wilmington, Del. The resulting data are in Table 13.

TABLE 13

EXAMPLE 13

| ZONYL FSH | Surface age milliseconds [ms] | | | |
|---|---|---|---|---|
| | 10 ms | 100 ms | 1000 ms | 10000 ms |
| | Surface Tension, mN/m | | | |
| 0.000 wt % | 50 | 49.0 | 49 | 48 |
| 0.050 wt % | 48 | 47.5 | 45 | 43 |

Example 14

ZONYL FSH was added in the amount shown in Table 14 to a proprietary floor coating containing a hydrocarbon surfactant available from Butcher's Wax in Marlborough, Mass. 01752. The surface tension of the resulting solution was measured as in Example 1, and the data are shown in Table 14. ZONYL FSH fluorocarbon surfactant was obtained from E. I. du Pont de Nemours and Company, Wilmington, Del.

TABLE 14

EXAMPLE 14

| ZONYL FSH | Surface age milliseconds [ms] | | | |
|---|---|---|---|---|
| | 10 ms | 100 ms | 1000 ms | 4000 ms |
| | Surface Tension, mN/m | | | |
| 0.000 wt % | 39 | 37 | 35 | 33.5 |
| 0.050 wt % | 40.5 | 37 | 33.5 | 32 |

The effect of added fluorosurfactant on the surface tension v. time profile of the commercial proprietary formulations is not as dramatic as the previous examples in deioinized water, at the lower concentration ranges, because of the presence of interfaces (solid/liquid and liquid/liquid) in the formulations which adsorb surfactant, and the higher viscosity of the systems, which slows diffusion of the surfactants.

What is claimed is:

1. A composition comprising from about 0.01% to about 0.5% by weight of a hydrocarbon surfactant that lowers surface tension in an aqueous system, and from 0.0001% to about 0.1% by weight of a fluorocarbon surfactant of formula $$(R_f)_a(Q)_b Z$$

wherein

Rf is a fluorinated non-aromatic radical of at least three carbon atoms,

Q is a linking group,

Z is a water solubilizing polar group, a is 1 or 2, and b is 0 or 1, provided that the hydrocarbon surfactant is present at less than or equal to 0.08% by weight when the fluorocarbon surfactant is present at 0.1% by weight, said composition reducing the surface tension of a coating or printing composition to which it is added within 10 seconds of application of said coating or printing composition to a substrate surface.

2. The composition of claim 1 wherein the weight ratio of hydrocarbon surfactant to fluorocarbon surfactant is at least 2.

3. The composition of claim 1 wherein the weight ratio of hydrocarbon surfactant to fluorocarbon surfactant is at least 5.

4. The composition of claim 1 wherein the fluorocarbon surfactant is a fluoroalkyl ethoxylate of the structure:

$$R_f—CH_2CH_2—O(CH_2CH_2O)_x—H$$

wherein x is from 2 to about 20, and $R_f$ is a perfluorinated hydrocarbon of the structure $CF_3—(CF_2CF_2)_n$ and n is from 2 to about 6.

5. The composition of claim 4 wherein the fluorocarbon surfactant is present at from about 0.001% to about 0.1% by weight.

6. A method for reducing surface tension of a coating or printing composition when applied to a substrate surface comprising mixing with the coating or printing composition a surfactant composition comprising from about 0.1% to about 0.5% by weight of a hydrocarbon surfactant that lowers surface tension in an aqueous system, and from about 0.0001% to about 0.1% by weight of a fluorocarbon surfactant of formula $$(R_f)_a(Q)_b Z$$

wherein

Rf is a fluorinated non-aromatic radical of at least three carbon atoms,

Q is a linking group,

Z is a water solubilizing polar group, a is 1 or 2, and b is 0 or 1, provided that the hydrocarbon surfactant is present at less than or equal to 0.08% by weight when the fluorocarbon surfactant is present 0.1% by weight, said surfactant composition reducing the surface tension of the coating or printing composition to which it is added within 10 seconds of application of said coating or printing composition to a substrate surface.

7. The method of claim 6 wherein the fluorocarbon surfactant is a fluoroalkyl ethoxylate of the structure:

$$R_f—CH_2CH_2—O(CH_2CH_2O)_x—H$$

wherein x is from 2 to about 20, and $R_f$ is a perfluorinated hydrocarbon of the structure $CF_3—(CF_2CF_2)_n$ and n is from 2 to about 6.

8. The method of Claim 6 wherein the substrate is selected from the group consisting of an organic polymer, metal, paper, paper product, natural or synthetic textile, leather, construction material, laminate, adhesive, film, and agricultural plants.

9. The method of claim 8 wherein the substrate is a construction material selected from the group consisting of wood, stone, concrete, brick, ceramics, tile, glass, stucco, gypsum, drywall, particle board, chip board, granite, marble, flagstone and sandstone.

10. A method for reducing surface tension of a coating or printing composition when applied to a substrate surface comprising mixing with the coating or printing composition from about 0.0001% to about 0.1% by weight of a fluorocarbon surfactant of formula $$(R_f)_a(Q)_b Z$$

wherein

Rf is a fluorinated non-aromatic radical of at least three carbon atoms,

Q is a linking group,

Z is a water solubilizing polar group, a is 1 or 2, and b is 0 or 1, provided that the coating or printing composition contains a hydrocarbon surfactant that lowers surface tension in an aqueous system, and said hydrocarbon surfactant is present at less than or equal to 0.08% by weight when the fluorocarbon surfactant is present at 0.1% by weight, said fluorocarbon surfactant reducing the surface tension of the coating or printing composition to which it is added within 10 seconds of application of said coating or printing composition to a substrate surface.

11. The method of claim 10 wherein the hydrocarbon surfactant is present at from about 0.01% to about 0.5% by weight.

* * * * *